United States Patent [19]

Montagna

[11] Patent Number: 5,317,165
[45] Date of Patent: May 31, 1994

[54] APPARATUS FOR DETECTING THE PRESENCE AND THE QUALITY OF A FLAME BY DETECTING AND ANALYZING ELECTROMAGNETIC RADIATION OF DIFFERENT WAVELENGTHS

[75] Inventor: Giovanni Montagna, Milan, Italy

[73] Assignee: SIE Systems S.p.A., Pero, Italy

[21] Appl. No.: 932,086

[22] Filed: Aug. 19, 1992

[30] Foreign Application Priority Data

Aug. 27, 1991 [IT] Italy .................. 91-A-002292

[51] Int. Cl.⁵ .................................. G01J 3/14
[52] U.S. Cl. .......................... 250/554; 250/227.23; 340/578
[58] Field of Search ................ 250/554, 227.23; 340/578

[56] References Cited

U.S. PATENT DOCUMENTS 4,037,113 7/1977 Moore ........................ 250/554

Primary Examiner—Davis L. Willis
Assistant Examiner—T. Davenport
Attorney, Agent, or Firm—Collard & Roe

[57] ABSTRACT

Apparatus with an element for detecting and focusing the electromagnetic radiation emitted by the flame of a burner, and with an element formed by a light-conductive bundle of fiber optics for transmitting and separating the radiation of different wavelengths, which are received and analyzed by separate sensors.

7 Claims, 6 Drawing Sheets

APPARATUS FOR DETECTING THE PRESENCE AND THE QUALITY OF A FLAME BY DETECTING AND ANALYZING ELECTROMAGNETIC RADIATION OF DIFFERENT WAVELENGTHS

BACKGROUND OF THE INVENTION

1. Field of the Invention

The present invention relates to an apparatus for detecting the presence and the quality of a flame. The apparatus includes a detecting and focusing element for the electromagnetic radiation of the flame, this element including a lens system and a suitable holding device. There is also a transmitting and separating element for the radiation, including a radiation inlet site, a light-conductive bundle of fiber optics, and an outlet and separation site. An element integrated with the transmitting and separating element for sealing the combustion chamber against the electric circuit of the apparatus, this element including the outlet and separation site filled with a cast liquid and a cured binding agent. There is an element contained in a metallic receptacle for measuring and analyzing the detected radiation, this element including suitable sensors and electronic circuits.

SUMMARY OF THE INVENTION

It is an object of the present invention to detect the radiation emitted by the combustion gas flame of a burner with the help of an optical element arranged near the flame, at operating temperatures of about 300° C. and at a peak temperature of 450° C.

It is a further object of the present invention to provide for the remote transmission of the radiation via a bundle of fiber optics, so that a transmission of electronic radiation is achieved with optimal efficiency, depending on the desired wavelength.

It is yet another object of the present invention to provide for the separation of radiation of different wavelengths by a combination of different light-conducive fiber optics and/or optical filters and/or sensors, which are designed for different ranges of wavelength.

It is yet a further object of the present invention to provide for recording the radiation of different wavelengths separately on separate sensors which are capable of analyzing the energy radiation of the combustion gas flame in the different ranges of wavelength.

It is still another object of the present invention to provide for the comparative analyzing of the radiation having different wavelengths and different modulation frequencies for detecting the presence and the quality of the flame, a well as any deviation from the optimal quality.

The above objects are achieved according to the invention by an apparatus having the following characteristic features.

The detecting element substantially comprises a collecting lens which, for evaluating the useful radiation generated by the combustion, focuses the radiation within the zone of its "geometric" focal point. The inlet head piece of a light-conductive bundle of fiber optics forming the transmitting and separating element is located and held in place at the focal point.

The transmitting and separating element is formed by light-conductive fiber optics whose transmission of radiation is adapted to the wavelengths intended for analyzing, whereby the light-conductive fibers are separated from one another at the outlet side in a separating element.

The separating element has means for the mechanical attachment and joining of the fiber optics, for guiding the fiber optics to the radiation-sensitive sensors, and for the sealed separation of the combustion chamber from the electrical circuitry of the apparatus.

Thus, the above objects are achieved according to the present invention by providing an apparatus for detecting the presence and the quality of a flame producing useful radiation and combustion gases in a combustion chamber, comprising an optical detecting and focusing element means which comprises a collecting lens having a geometric focal point for focusing the useful radiation serving for analysis of the combustion gases, said focusing being within the zone of the geometric focal point of the lens; an optical transmitting element means for the radiation comprising an inlet head piece of a radiation-conductive fiber optics bundle which forms the transmitting element; said transmitting element being formed by radiation-conductive optical fibers in which each fiber has a radiation conductivity adapted to the radiation wavelength intended for the analysis; an element means for separating the radiation and for sealing the combustion chamber; said element means having means for the mechanical fixation of the fibers, for guiding the fibers to the radiation sensitive detecting and focusing element means, and for sealing off the gases originating from the interior of the combustion chamber; said separating element means separating the fibers from one another at an outlet side end thereof; and means serving for measuring and analyzing the radiation.

BRIEF DESCRIPTION OF THE DRAWINGS

Other objects and features of the present invention will become apparent from the following detailed description considered in connection with the accompanying drawings which discloses several embodiments of the present invention. It should be understood, however, that the drawings are designed for the purpose of illustration only and not as a definition of the limits of the invention.

In the drawings, wherein similar reference characters denote similar elements throughout the several views.

Figure 2A:
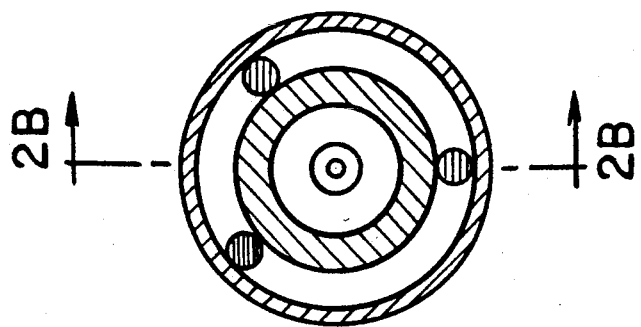
Figure 2B:
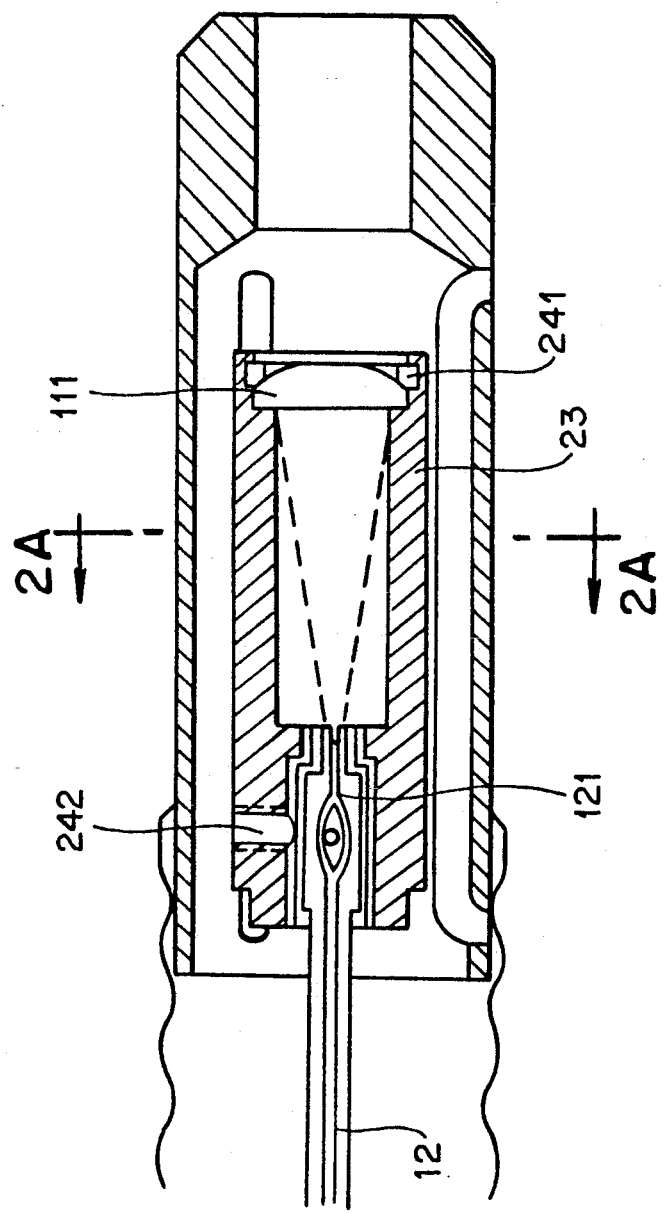
Figure 3A:
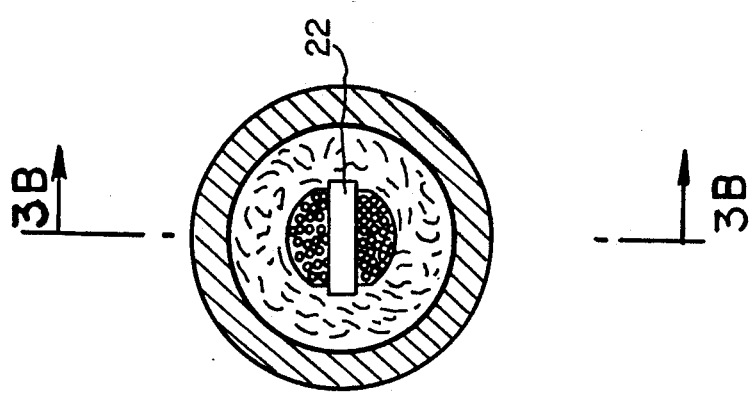
Figure 3B:
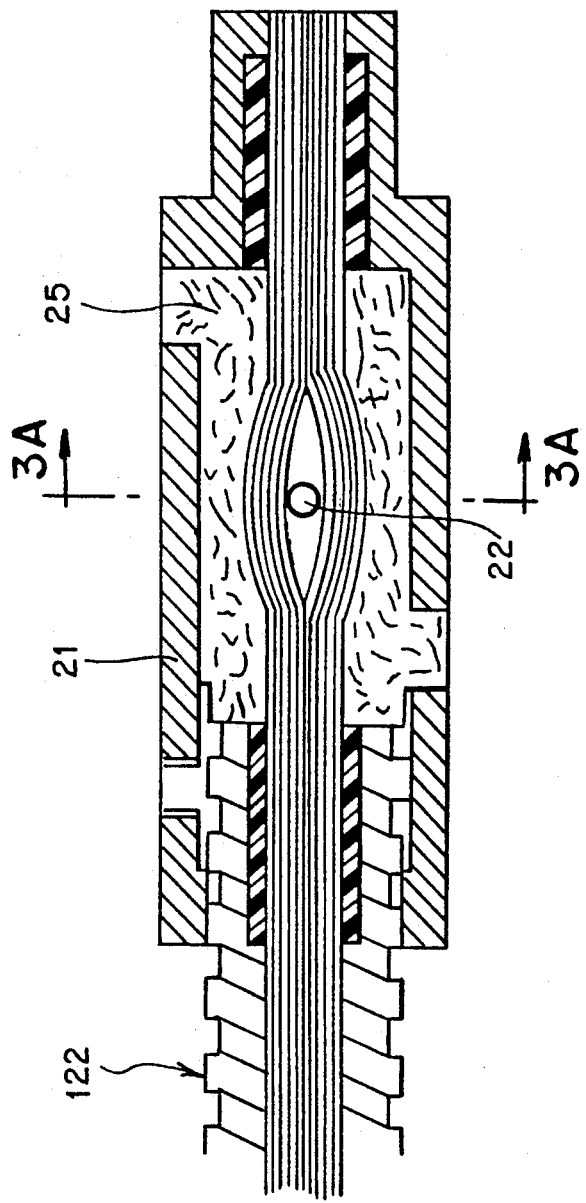
Figure 4A:
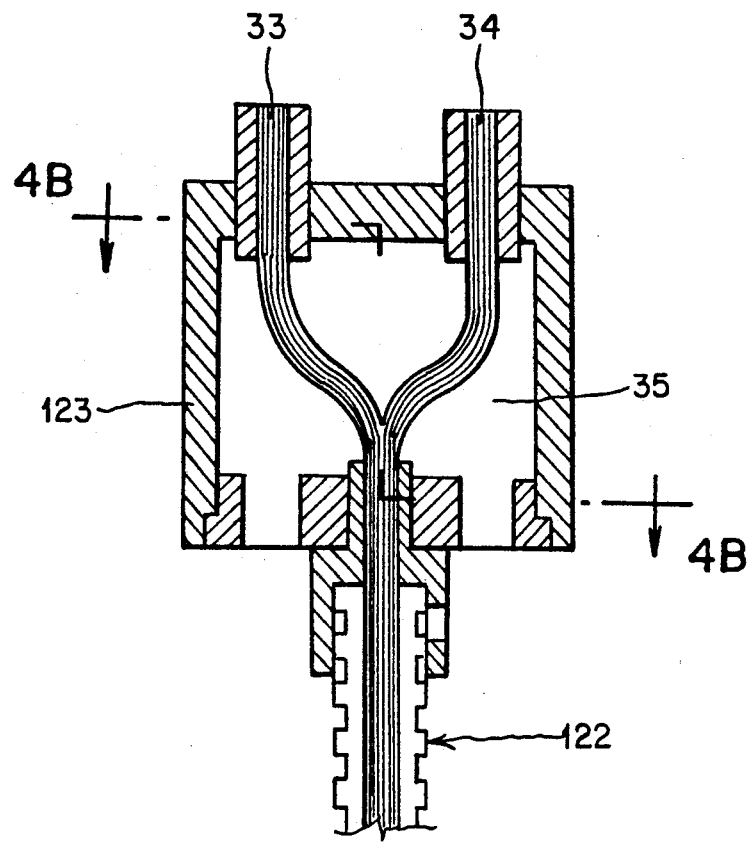
Figure 4B:
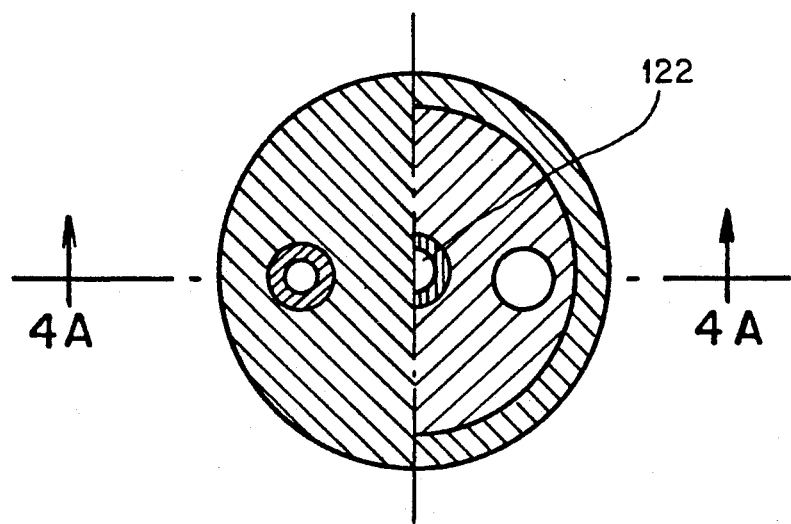
Figure 5B:
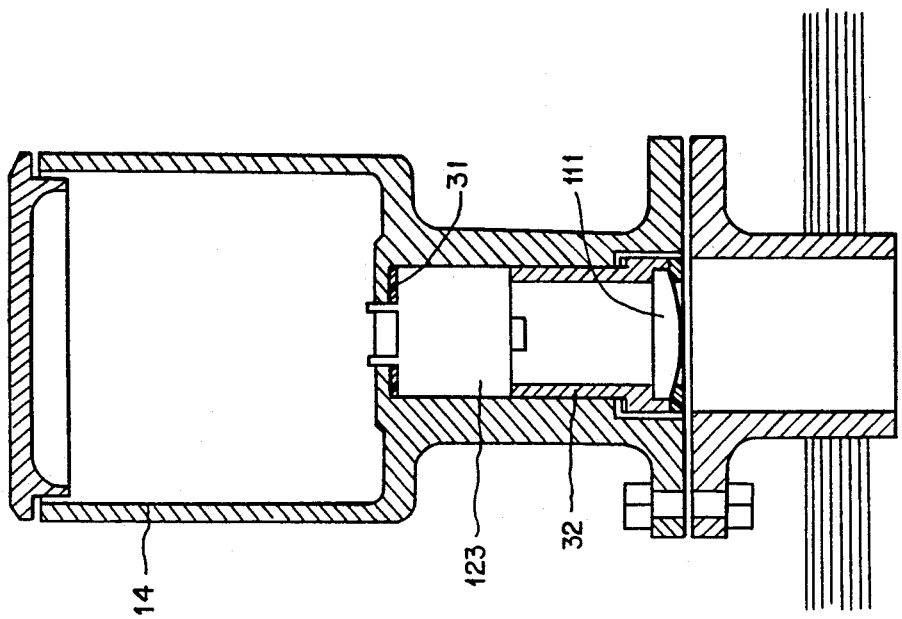
Figure 5A:
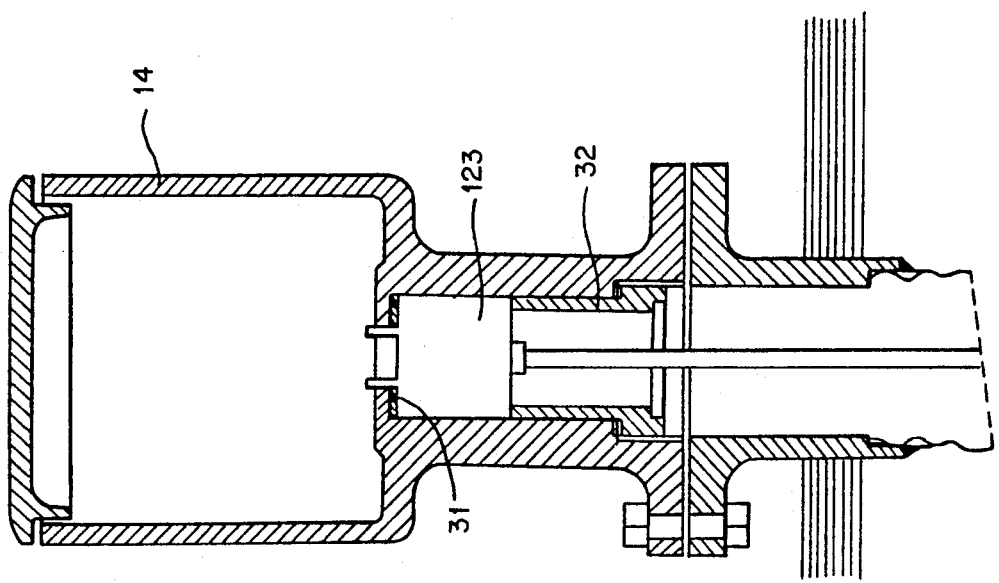

FIG. i-B shows a schematic partial section view of a compact embodiment of the apparatus of the invention;

FIG. 2-A shows a section view along line H—H of FIG. 2-B of the detecting element according to the invention;

FIG. 2-B shows a section view along line X—X of FIG. 2-A of the detecting element according to the invention;

FIG. 3-A shows a section view along line K—K of FIG. 3-B of the inlet head piece of the light-conductive bundle of fiber optics according to the invention;

FIG. 3-B shows a section view along line L—L of FIG. 3-A of the inlet head piece of the light-conductive bundle of fiber optics according to the invention;

FIG. 4-A shows a section view along line W—W of FIG. 4-B of a separating element according to the invention;

FIG. 4-B shows a section view along line J—J of FIG. 4-A of a separating element according to the invention;

FIG. 5-A shows a section view of the application of the separating element for shutting off the combustion gases originating in the interior of the combustion chamber for the enlarged model of the apparatus; and FIG. 5-B shows a section view of the application of the separating element for shutting off the combustion gases originating in the interior of the combustion chamber for the compact model of the apparatus.

DETAILED DESCRIPTION OF PREFERRED EMBODIMENTS

Figure 1A:
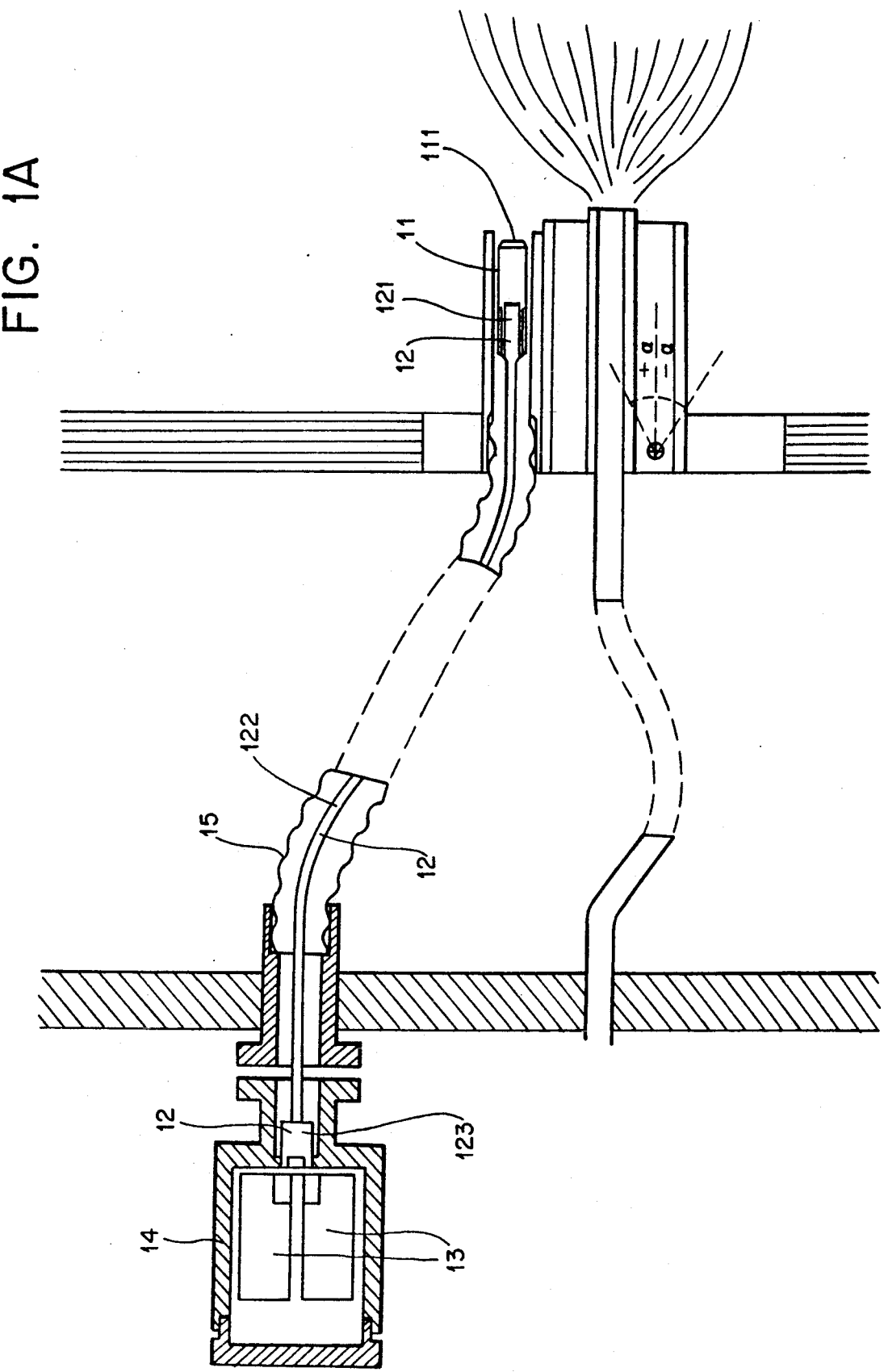
FIG. 1-A shows a schematic partial section view of an enlarged embodiment of the apparatus of the invention.
Figure 1B:
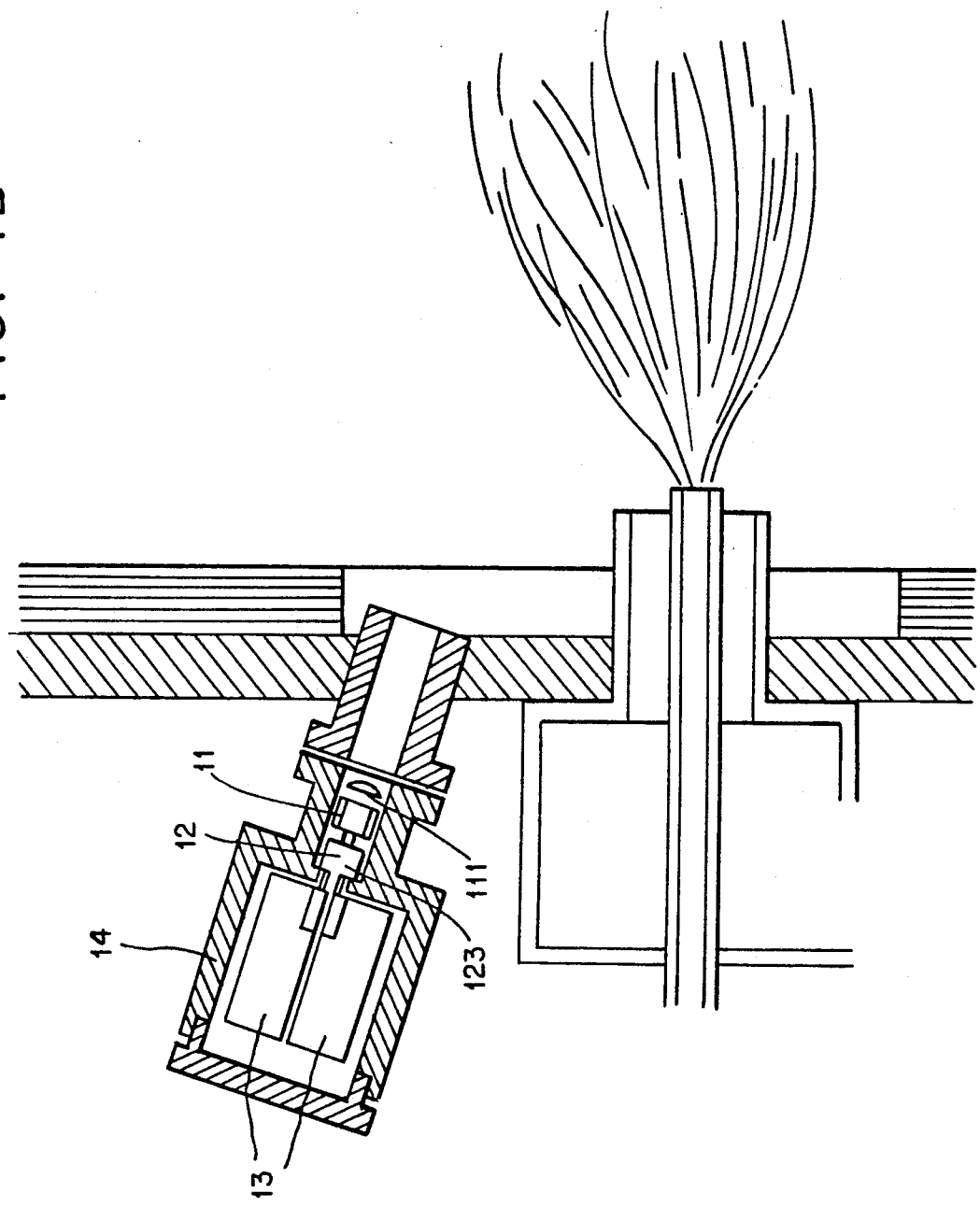

Turning now in detail to the drawings, FIG. 1-A shows the detection element 11 arranged in the immediate proximity of the flame in the interior of the combustion chamber, depending on the design and the space conditions of the combustion chamber.

In such a case, the transmitting and separating element has an appropriate length (enlarged or stretched embodiment of the apparatus) and contains all the required components, FIG. 1-A.

In FIG. 1-B, the detection element 11 is arranged far removed from the flame, and the transmitting and separating element correspondingly have a minimum length (compact embodiment of the apparatus), and all the required components, such as 12, are united in the outlet and separation site 123.

With the stretched or enlarged embodiment of the apparatus, the detection element is mounted on the body of the burner. The typical set-up diagram is shown in FIG. 1-A, where 11 denotes the detection element and 12 denotes the transmitting element, which is comprised of the inlet site 121, the separation site 123, and the bundle of fiber optics 122 disposed in between, the latter being provided with a flexible jacket 15 and leading to a receptacle 14 containing the sensors and the associated amplifying circuits 13.

The apparatus having the compact design is mounted directly on the wall of the combustion chamber, as shown in FIG. 1-B, where the detecting and focusing element 11 is disposed within the proximity of the outlet and separation site 123, which, in the present case, assumes the functions of the inlet site and the transmitting elements.

The radiation detecting element 11, which is arranged near the flame, is shown in greater detail in the embodiment illustrated in FIGS. 2-A and 2-B. It is substantially comprised of two parts.

First, there is a collecting lens 111, whose surface area permits receiving a desired amount of energy, and whose curvature is designed in such a way that the lens, taking into account the aberration, focuses all useful radiation serving for the evaluation of the combustion, namely, ultraviolet (wavelength 190–300 nm) to visible (400–750 nm) to infrared (800–2,500 nm) useful radiation within the zone of its "geometric" focal point to an area of 3.5 mm$^2$ at the most.

Second, there is a protective sleeve 23, which receives the inlet head piece 121 in the geometric focal point of the lens 111.

The positions of the lens 111 and of the inlet head piece 121 of the fiber optics bundle are secured relative to one another by the sleeve 23.

Two fixing members 241 and 24 hold the lens and the head piece in the predetermined positions.

The structure of the inlet head piece 121 is shown in detail in FIGS. 3-A and 3-B. The head piece is structured in such a wa that it is capable of withstanding operating temperatures of about 300° C. and peak temperatures of 450° C., as well as mechanical loads, which have to be attributed to a swinging motion denoted by $-\alpha$ to $+\alpha$, as shown in FIG. 1-A. The swinging motion is rigidly coupled with the motion of the body of the burner, so that no slip occurs between the fiber bundle 122 and the protective sleeve. This property assures that the end surface of the fiber bundle always remains in the focal point of the lens (FIG. 2-B) and continuously receives the highest possible share of the energy radiated by the flame and collected by the lens.

This is achieved by a spreading member 22, which is inserted in the cold condition in the interior of the fiber optics bundle 122, which member 22 separates and removes the fibers from one another and thus forms a site with an expanded diameter of the bundle.

A liquid, rapidly curing binding agent 25, such as a thermosetting resin, for example, phenol formaldehyde resin, is subsequently injected under pressure into the intermediate space between the fiber bundle so deformed and the holding and protecting sleeve 21. This binding agent, upon setting, fixes the fiber bundle in the desired position and at the same time prevents the aforementioned slip.

The light-conducting fibers available on the market from conventional sources have different radiation transmission properties or conductivity, depending on the wavelength of the radiation. Accordingly, the fiber optics bundle is structured with such fibers whose properties are either the same or different from one another, depending on which wavelengths are to be evaluated.

In the two embodiments illustrated, different types of light-conducting fiber optics are used for transmitting ultraviolet, visible and infrared light signals, respectively.

In this way, a first separation of the radiation is obtained.

The separation of the fibers with different electromagnetic radiation conductivity takes place at the outlet side end of the fiber optics bundle (FIG. 4-A and FIG. 4-B), which is intended for use at ambient temperature.

So that the separation of the fibers and their mechanical fixation are achieved at the same time, provision is made for a separating element cylindrical metallic hollow body 123 (FIG. 4-A and FIG. 4-B), which has openings in its bottom. These openings serve for receiving the individual components of the radiation conductive or light conductive fiber optics bundle (two components thereof are denoted by 33 and 34), each of which has homogeneous fibers among one another, with a different electromagnetic radiation conductivity or light conductivity from one component to another.

The separating element 123 intended for optical separation also serves as a sealing means for excluding the combustion gases, which otherwise could pass from the interior of the combustion chamber into the receptacle (FIG. 5-A and FIG. 5-B) containing the sensors and the associated amplifying circuits.

Such cutoff prevents any leakage of combustion gas into the interior of the receptacle 14 which may cause an explosion. Thus, the apparatus is rendered explosion-proof.

To achieve this result, the cylindrical hollow body 123 is completely filled with a liquid, rapidly setting binding agent 35 which is similar to binding agent 25. Thus, the hollow body 123 receiving and separating the light-conductive fibers becomes a massive cylindrical body.

Completely gas-tight cutoff is achieved by inserting an elastic seal 31 (FIG. 5-A and FIG. 5-B) between the body 123 and the receptacle 14.

Fixing of the body 123 and of the associated seal 31 is achieved with the help of a threaded ring 32.

While only two embodiments of the present invention have been shown and described, it is to be understood that many changes and modifications may be made thereunto without departing from the spirit and scope of the invention as defined in the appended claims.

What is claimed is:

1. An apparatus for detecting the presence and the quality of a flame producing radiation and combustion gases in a combustion chamber, comprising:

an optical detecting and focusing element means which comprises a collecting lens having a geometric focal point for focusing the radiation serving for analysis of the combustion gases, said focusing being within a zone of the geometric focal point of the lens;

an optical transmitting element means for the radiation comprising an inlet head piece of a radiation-conductive fiber optics bundle which forms the transmitting element; said transmitting element being formed by radiation-conductive optical fibers in which each fiber has a radiation conductivity adapted to the radiation wavelength intended for the analysis;

wherein in the interior of the fiber optics bundle, a spreading member is inserted on the inlet head piece of said bundle, said spreading member for separating a part of the bundle at a given point into separate parts at the location of the spreading member;

an element means for separating the radiation and for sealing the combustion chamber; said element means having means for the mechanical fixation of the fibers, for guiding the fibers to the said optical radiation sensitive detecting and focusing element means, and for sealing off the gases originating from the interior of the combustion chamber; said separating element means separating the fibers from one another at an outlet side end thereof; and means for measuring and analyzing the radiation.

2. The apparatus as defined in claim 1, wherein the lens of the detecting element focuses the radiation serving for the analysis of the combustion gases to an area of not greater than 3.5 $mm^2$.

3. The apparatus as defined in claim 1, wherein the inlet head piece of the bundle is contained and protected in an outer sleeve; and further comprising an intermediate space between the inlet head piece and the outer sleeve, said intermediate space filled with a liquid binding agent set therein.

4. The apparatus as defined in claim 3, further comprising an assembly device having a steel sleeve which contains the means for receiving the lens and the inlet head piece.

5. The apparatus as defined in claim 1, wherein the light-conductive fiber optics bundle is formed by at least two of three or more types of fiber optics, each serving for transmitting light signals in the ultraviolet or visible or infrared range, respectively.

6. An apparatus for detecting the presence and the quality of a flame producing radiation and combustion gases in a combustion chamber, comprising:

an optical detecting and focusing element means which comprises a collecting lens having a geometric focal point for focusing the radiation serving for analysis of the combustion gases, said focusing being within a zone of the geometric focal point of the lens;

an optical transmitting element means for the radiation comprising an inlet head piece of a radiation-conductive fiber optics bundle which forms the transmitting element; said transmitting element being formed by radiation-conductive optical fibers in which each fiber has a radiation conductivity adapted to the radiation wavelength intended for the analysis;

an element means for separating the radiation and for sealing the combustion chamber; said element means having means for the mechanical fixation of the fibers, for guiding the fibers to said optical radiation sensitive detecting and focusing element means, and for sealing off the gases originating from the interior of the combustion chamber; said separating element means separating the fibers from one another at an outlet side end thereof;

wherein the separating element is formed by a metallic hollow body having an opening for receiving the radiation-conductive fiber optics bundle, on the one side, and for openings for receiving the individual, separated fiber components of the bundle, on the other side;

wherein there is a hollow space in the metallic hollow body forming the separating element, and said hollow space is filled with a liquid binding agent set therein; and means for measuring and analyzing the radiation.

7. An apparatus for detecting the presence and the quality of a flame producing radiation and combustion gases in a combustion chamber, comprising:

an optical detecting and focusing element means which comprises a collecting lens having a geometric focal point for focusing the radiation serving for analysis of the combustion gases, said focusing being within a zone of the geometric focal point of the lens;

an optical transmitting element means for the radiation comprising an inlet head piece of a radiation-conductive fiber optics bundle which forms the transmitting element; said transmitting element being formed by radiation-conductive optical fibers in which each fiber has a radiation conductivity adapted to the radiation wavelength intended for the analysis;

an element means for separating the radiation and for sealing the combustion chamber; said element means having means for the mechanical fixation of the fibers, for guiding the fibers to said optical radiation sensitive detecting and focusing element means, and for sealing off the gases originating from the interior of the combustion chamber; said separating element means separating the fibers from one another at an outlet side end thereof;

wherein the separating element filled with a liquid binding agent which is set seals the combustion chamber to prevent the transfer of the gases from the combustion chamber to the container of the sensors, whereby the total apparatus is rendered explosion-proof; and means for measuring and analyzing the radiation.

* * * * *